(12) United States Patent
Shoap

(10) Patent No.: US 9,561,393 B2
(45) Date of Patent: Feb. 7, 2017

(54) FLUID HOSE APPARATUS WITH INTEGRATED NOZZLE AND RELATED SYSTEMS AND METHODS

(71) Applicant: Stephen D. Shoap, Wakefield, MA (US)

(72) Inventor: Stephen D. Shoap, Wakefield, MA (US)

(*) Notice: Subject to any disclaimer, the term of this patent is extended or adjusted under 35 U.S.C. 154(b) by 0 days.

(21) Appl. No.: 14/713,033

(22) Filed: May 15, 2015

(65) Prior Publication Data

US 2015/0328487 A1 Nov. 19, 2015

Related U.S. Application Data

(60) Provisional application No. 61/996,863, filed on May 16, 2014, provisional application No. 61/998,041, filed on Jun. 17, 2014.

(51) Int. Cl.

| A62C 31/05 | (2006.01) |
|---|---|
| A62C 33/04 | (2006.01) |
| A01G 25/02 | (2006.01) |
| B05B 1/20 | (2006.01) |
| B05B 15/06 | (2006.01) |

(52) U.S. Cl.
CPC ............... *A62C 31/05* (2013.01); *A62C 33/04* (2013.01); *A01G 25/02* (2013.01); *A01G 25/023* (2013.01); *B05B 1/20* (2013.01); *B05B 1/202* (2013.01); *B05B 15/066* (2013.01); *B05B 15/069* (2013.01)

(58) Field of Classification Search
CPC ......... A62C 31/05; A62C 33/04; A01G 25/02; A01G 25/023; A01G 27/005; B05B 15/069; B05B 15/066; B05B 1/20; B05B 1/2022

USPC .......... 169/16; 239/548–568, 547, 542, 276, 239/266, 268–269, 536, 533.1
See application file for complete search history.

(56) References Cited

U.S. PATENT DOCUMENTS

| 2,716,574 A | * | 8/1955 | Chase | B05B 15/069 239/547 |
|---|---|---|---|---|
| 2,814,529 A | * | 11/1957 | Arnt | B05B 1/20 138/103 |
| 3,091,401 A | * | 5/1963 | Hruby, Jr. | B05B 1/202 239/269 |
| 3,746,263 A | * | 7/1973 | Reeder | A01G 25/023 137/270 |
| 3,882,892 A | * | 5/1975 | Menzel | A01G 25/02 137/513.3 |
| 3,979,070 A | * | 9/1976 | Lemelshtrich | A01G 25/023 239/542 |
| 4,037,791 A | * | 7/1977 | Mullett | A01G 25/023 138/45 |
| 4,095,745 A | * | 6/1978 | Christy | A01G 25/023 239/109 |

(Continued)

*Primary Examiner* — Arthur O Hall
*Assistant Examiner* — Joseph A Greenlund
(74) *Attorney, Agent, or Firm* — Hayes Soloway PC

(57) ABSTRACT

A fluid hose apparatus with integrated nozzle includes a hose having at least one sidewall hole formed within a sidewall thereof. At least one patch is affixed to the sidewall of the hose, the at least one patch positioned over the at least one sidewall hole. A chamber is formed between the at least one patch and the sidewall of the hose, wherein the chamber is in fluid communication with the at least one sidewall hole. At least one nozzle is formed in an exterior wall of the at least one patch, wherein the at least one nozzle is in fluid communication with the chamber. A related supply line system for conveying and spraying a fluid and method of protecting an elongated hose from a heat source is also disclosed.

20 Claims, 9 Drawing Sheets

(56) References Cited

U.S. PATENT DOCUMENTS

| | | | | |
|---|---|---|---|---|
| 4,177,947 A * | 12/1979 | Menzel | B05B 1/3026 | 138/45 |
| 4,209,133 A * | 6/1980 | Mehoudar | A01G 25/023 | 137/501 |
| 4,344,576 A * | 8/1982 | Smith | B05B 15/02 | 239/542 |
| 4,392,616 A * | 7/1983 | Olson | A01G 25/026 | 239/271 |
| 4,460,129 A * | 7/1984 | Olson | A01G 25/023 | 138/42 |
| 4,502,631 A * | 3/1985 | Christen | A01G 25/023 | 239/106 |
| 5,015,102 A * | 5/1991 | Yamaguchi | G01K 13/002 | 374/107 |
| 5,027,048 A * | 6/1991 | Masrur | B60G 13/14 | 177/184 |
| 5,052,625 A * | 10/1991 | Ruskin | A01G 25/023 | 239/542 |
| 5,279,460 A * | 1/1994 | Yu | A01G 25/023 | 239/1 |
| 5,333,793 A * | 8/1994 | DeFrank | A01G 25/02 | 239/533.1 |
| 6,012,102 A * | 1/2000 | Shachar | G06F 17/30879 | 235/385 |
| 6,039,270 A * | 3/2000 | Dermitzakis | B29C 47/0023 | 239/542 |
| 6,302,335 B1 * | 10/2001 | Ormiston | B05B 1/207 | 239/214 |
| 6,592,049 B1 * | 7/2003 | Wolput | B05B 1/202 | 239/211 |
| 7,445,068 B2 * | 11/2008 | Rebholz | B60K 17/02 | 180/76 |
| 7,445,168 B2 * | 11/2008 | Ruskin | A01G 25/023 | 239/542 |
| 7,832,492 B1 * | 11/2010 | Eldridge | A62C 3/0278 | 169/24 |
| 7,913,935 B2 * | 3/2011 | Einav | A01G 25/02 | 239/196 |
| 8,141,589 B2 * | 3/2012 | Socolsky | A01G 25/023 | 138/37 |
| 8,267,115 B2 * | 9/2012 | Giuffre' | G05D 7/0113 | 137/504 |
| 8,317,111 B2 * | 11/2012 | Cohen | A01G 25/023 | 239/542 |
| 8,348,182 B2 * | 1/2013 | Keren | A01G 25/02 | 137/516.25 |
| 8,493,193 B2 * | 7/2013 | Louis | E05B 81/06 | 340/425.5 |
| 8,496,193 B2 * | 7/2013 | Rosenberg | A01G 25/023 | 138/42 |
| 8,511,586 B2 * | 8/2013 | Einav | A01G 25/023 | 138/42 |
| 8,550,715 B2 * | 10/2013 | Anzini | B65D 33/2541 | 24/399 |
| 8,579,215 B2 * | 11/2013 | Zavoli | B05B 1/185 | 239/542 |
| 8,672,240 B2 * | 3/2014 | Masarwa | A01G 25/02 | 138/124 |
| 8,998,113 B2 * | 4/2015 | Keren | A01G 25/023 | 239/542 |
| 2002/0170980 A1 * | 11/2002 | Brim | A62C 3/0292 | 239/276 |
| 2006/0043219 A1 * | 3/2006 | Raanan | B29C 44/32 | 239/542 |
| 2006/0169805 A1 * | 8/2006 | Dabir | A01G 25/023 | 239/542 |
| 2006/0261194 A1 * | 11/2006 | Ding | A01G 25/06 | 239/542 |
| 2009/0051159 A1 * | 2/2009 | Cameron | F16L 41/14 | 285/5 |
| 2009/0078323 A1 * | 3/2009 | Davis | F16K 24/04 | 137/209 |
| 2009/0224078 A1 * | 9/2009 | Anderson | A01G 25/02 | 239/542 |
| 2009/0266388 A1 * | 10/2009 | Legault | B05B 1/202 | 134/172 |
| 2011/0186658 A1 * | 8/2011 | Wuchert | B05B 3/18 | 239/723 |
| 2013/0119154 A1 * | 5/2013 | Sawyer | B05B 1/02 | 239/289 |
| 2013/0248616 A1 * | 9/2013 | Ensworth | A01G 25/026 | 239/11 |
| 2014/0246520 A1 * | 9/2014 | Einav | A01G 25/023 | 239/542 |
| 2015/0201568 A1 * | 7/2015 | Einav | A01G 25/023 | 239/542 |

* cited by examiner

FLUID HOSE APPARATUS WITH INTEGRATED NOZZLE AND RELATED SYSTEMS AND METHODS

CROSS REFERENCE TO RELATED APPLICATION

This application claims benefit of U.S. Provisional Application Ser. No. 61/996,863, entitled, "A Low Profile Spray Nozzle for a Hose" filed May 16, 2014 and U.S. Provisional Application Ser. No. 61/998,041 entitled "A Low Profile Spray Nozzle for a Hose" filed Jun. 17, 2014, the entire disclosure of which is incorporated herein by reference.

FIELD OF THE DISCLOSURE

The present disclosure is generally related to hose nozzles and more particularly is related to a fluid hose apparatus with integrated nozzle and related systems and methods.

BACKGROUND OF THE DISCLOSURE

Firefighters use hoses to spray water, or other fluids, onto fires in order to extinguish the fires. The water exits these hoses from a nozzle at the end of the hoses, which the firefighters can direct to an appropriate location. Non-structural fires, such wildfires, bushfires, or grassfires, commonly have a wide front which is difficult to fight with conventional hoses. Fire fighters on the ground, or on fire trucks, can spray water onto only a small section of a wide area fire at any given moment, which may allow fires in other areas to increase. Sometimes, fire trucks can become surrounded and trapped by a fast moving fire.

One method of stopping a grassfire or a wildfire is to create a fire break, a gap in vegetation or other combustible material that acts as a barrier to slow or stop the progress of a bushfire or wildfire. Fire breaks often have a size in the range of 10 feet wide and as long as deemed necessary, usually sufficiently long to prevent the fire from moving around the fire break. Most fire breaks are created by teams of firefighters with hand tools, which is highly labor intensive. Where possible, tractors and plows can be used to create the fire breaks, but many wildfire locations are not easily accessible. Furthermore, when using fire breaks, wildfires can quickly become large and difficult to control. Large fires create winds that blow burning embers through the air over long distances. A 10 foot fire break can be easily jumped by blowing embers, which subverts the intended purpose of the fire break.

Within the industry, some conventional devices are available to help prevent blowing embers moving past a fire break. One such device, called a water curtain, uses a conventional hose that has many simple holes that are placed close together along the length of the hose. As water is pumped through the hose, it exits each hole and is directed straight up in a vertical column. The resulting overall spray shape is that of a thin curtain, in that, the spraying water is positioned along the length of the hose, but it is only a very thin wall of water. These water curtains are rarely used because they are too thin to significantly reduce radiant heat from a fire, and because the available water is better used to wet the nearby fuels to prevent their ignition.

One technique to protect a structure, such as a building, from a wildfire is to deploy a defensive line of rotating sprinklers on tripods, and to supply these sprinklers with water using fire hoses. Setting up such a system can be very time consuming, and the hardware required is expensive.

Another technique to protect a structure is to place permanent sprinklers on the roofs or walls of the structures. This technique, unfortunately, allows the fire to get very close to the structure before encountering a spray of water or other fire resisting fluids, which subjects the structure to high temperatures from the encroaching fire. The radiant heat from a fire can be very intense and it is best to keep the fire farther away from the structure. Placing sprinklers on the structure is not as effective as having a system located farther from the structure which can spray fluid to stop a wildfire.

Thus, a heretofore unaddressed need exists in the industry to address the aforementioned deficiencies and inadequacies.

SUMMARY OF THE DISCLOSURE

Embodiments of the present disclosure provide a fluid hose apparatus with integrated nozzle. Briefly described, in architecture, one embodiment of the apparatus, among others, can be implemented as follows. A hose has at least one sidewall hole formed within a sidewall thereof. At least one patch is affixed to the sidewall of the hose, the at least one patch positioned over the at least one sidewall hole. A chamber is formed between the at least one patch and the sidewall of the hose, wherein the chamber is in fluid communication with the at least one sidewall hole. At least one nozzle is formed in an exterior wall of the at least one patch, wherein the at least one nozzle is in fluid communication with the chamber.

The present disclosure can also be viewed as providing a supply line system for conveying and spraying a fluid. Briefly described, in architecture, one embodiment of the system, among others, can be implemented as follows. An elongated hose has a plurality of sidewall holes formed within a sidewall thereof and positioned at spaced intervals along a length of the hose. The elongated hose carries a quantity of pressurized fluid. A plurality of patches is affixed to the sidewall of the hose. Each of the patches is positioned over at least one of the plurality of sidewall holes. A chamber is formed between each of the plurality of patches and the sidewall of the hose, wherein each chamber is in fluid communication with at least one of the plurality of sidewall holes. At least one nozzle is formed in an exterior wall of each of the plurality of patches, wherein the at least one nozzle is in fluid communication with the chamber of each of the plurality of patches, wherein a portion of the quantity of pressurized fluid is expelled from each of the at least one nozzles.

The present disclosure can also be viewed as providing a method of protecting an elongated hose from a heat source. In this regard, one embodiment of such a method, among others, can be broadly summarized by the following steps: transporting a quantity of pressurized fluid through a hose; directing a portion of the quantity of pressurized fluid through at least one sidewall hole formed within a sidewall of the hose; dispersing a directional path of the portion of the quantity of pressurized fluid within a chamber, wherein the chamber is formed between at least one patch and the sidewall of the hose; dispersing the portion of the quantity of pressurized fluid through at least one nozzle formed in an exterior wall of the at least one patch.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
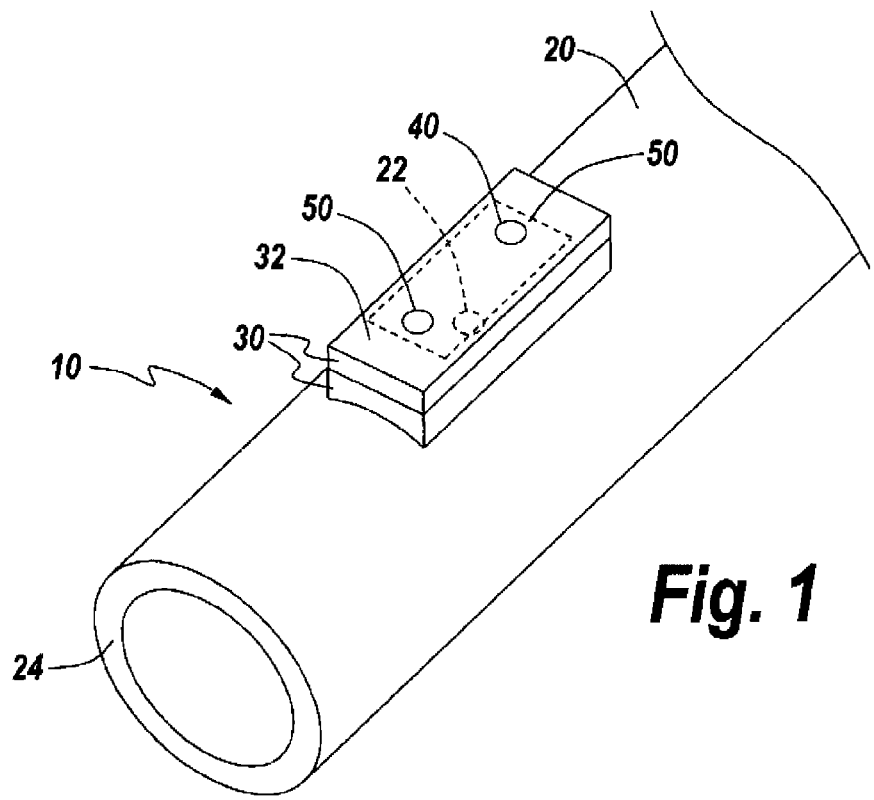
FIG. 1 is an isometric view illustration of a fluid hose apparatus with integrated nozzle, in accordance with a first exemplary embodiment of the present disclosure.
Figure 2:
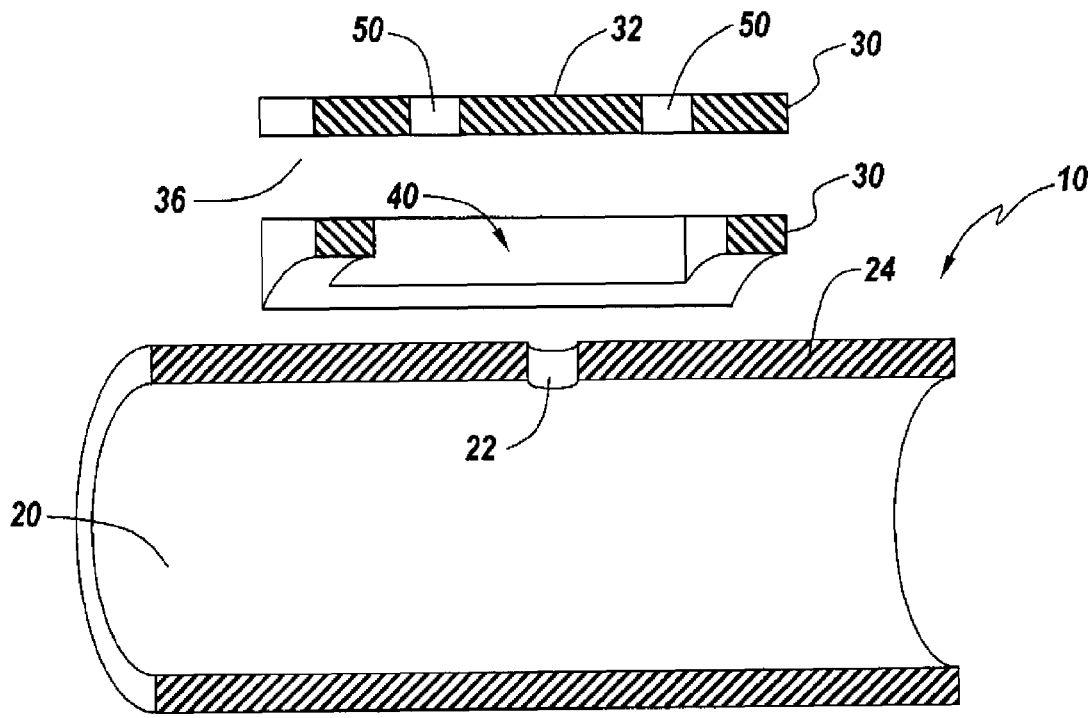
FIG. 2 is an exploded, side cross-sectional view illustration of the fluid hose apparatus with integrated nozzle of FIG. 1, in accordance with the first exemplary embodiment of the present disclosure.
Figure 3:
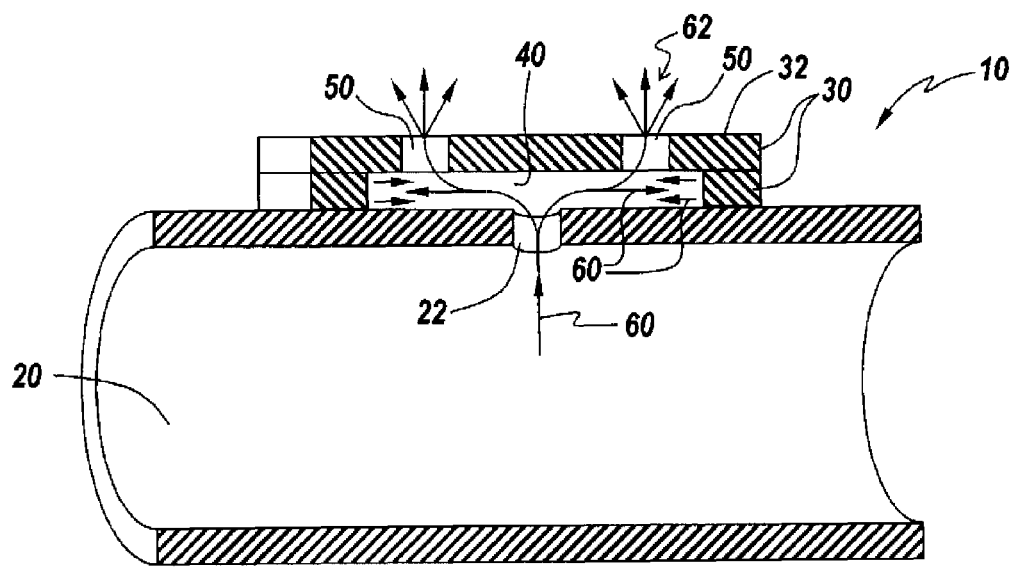
FIG. 3 is a side cross-sectional view illustration of fluid paths within the fluid hose apparatus with integrated nozzle of FIG. 1, in accordance with the first exemplary embodiment of the present disclosure.
Figure 4:
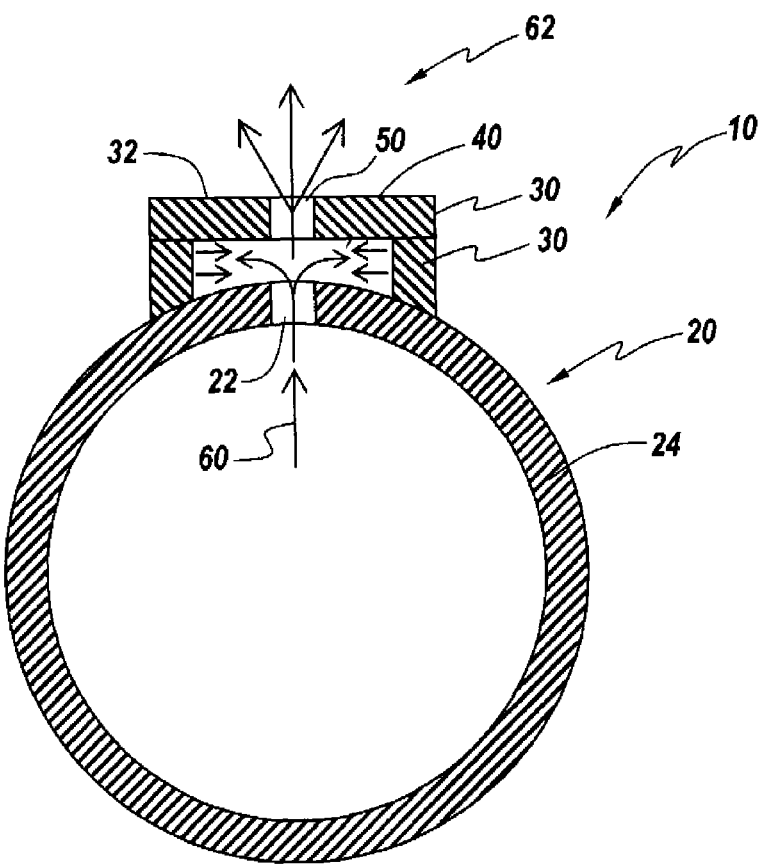
FIG. 4 is a front cross-sectional view illustration of fluid paths within the fluid hose apparatus with integrated nozzle of FIG. 1, in accordance with the first exemplary embodiment of the present disclosure.

FIG. 1 is an isometric view illustration of a fluid hose apparatus with integrated nozzle 10, in accordance with a first exemplary embodiment of the present disclosure. FIG. 2 is an exploded, side cross-sectional view illustration of the fluid hose apparatus with integrated nozzle 10 of FIG. 1, in accordance with the first exemplary embodiment of the present disclosure. FIG. 3 is a side cross-sectional view illustration of fluid paths within the fluid hose apparatus with integrated nozzle 10 of FIG. 1, in accordance with the first exemplary embodiment of the present disclosure. FIG. 4 is a front cross-sectional view illustration of fluid paths within the fluid hose apparatus with integrated nozzle 10 of FIG. 1, in accordance with the first exemplary embodiment of the present disclosure. With reference to FIGS. 1-4, the fluid hose apparatus with integrated nozzle 10, which may be referred to herein simply as 'apparatus 10', includes a hose 20 having at least one sidewall hole 22 formed within a sidewall 24 thereof. At least one patch 30 is affixed to the sidewall 24 of the hose 20 and positioned over the at least one sidewall hole 22. A chamber 40 is formed between the at least one patch 30 and the sidewall 24 of the hose 20. The chamber 40 is in fluid communication with the at least one sidewall hole 22. At least one nozzle 50 is formed in an exterior wall 32 of the at least one patch 30, wherein the at least one nozzle 50 is in fluid communication with the chamber 40.

The apparatus 10 may provide significant benefits in fluid transportation through hoses which are located in environments prone to damaging the hoses. As a primary example herein, the apparatus 10 may provide significant benefits in fighting non-structural fires, such as wildfires, forest fires, bushfires, grassfires, or other fires which require hoses to be located in settings where the radiant heat from the fire can damage the hose. The hose 20 may include a fluid pipe or conduit which is capable of carrying fluid under pressure. The fluid may include water or other fire resistant fluids, such as flame retardant chemicals. The hose 20 may have any length or diameter, and may be constructed from a variety of materials conventionally used within the industry.

The hose 20 has at least one sidewall hole 22 formed within a sidewall 24 thereof. Commonly, a plurality of sidewall holes 22 may be formed within the sidewall 24 of the hose 20 along its length, or a portion of its length. The size of the sidewall hole 22 may vary depending on the size of the hose 20 and/or an intended design of the apparatus 10, such as to provide for a desired flow rate of the fluid through the apparatus 10. The sidewall hole 22 may further include a grommet or similar structure to maintain a shape or size of the sidewall hole 22 within the sidewall 24, e.g., to prevent tearing, stretching, or fraying of the hose material surrounding the sidewall hole 22.

The at least one patch 30 may be an attachment to the hose 20 which is substantially integrated into the general shape of the hose 20. The patch 30 may commonly include a plurality of patches 30 which are overlaid on one another to create a compounded patch. As is shown in FIGS. 1-4, two patches 30 are used, where an interior of a lower patch substantially forms the chamber 40 and the at least one nozzle 50 is formed in an upper patch overlaying the lower patch. The patch 30 may be affixed to an exterior surface of the sidewall 24 of the hose 20 with a variety of connections, such as with using adhesives, chemical bonds, material welds or fusing, mechanical fasteners, or other devices which can create a fluid-tight connection. The patch 30 is positioned on the hose 20 in a location overlying the at least one sidewall hole 22.

Interior of the patch 30, the chamber 40 is in fluid communication with the sidewall hole 22 to allow fluid within the hose 20 to exit an interior of the hose 20 through the sidewall hole 22 and enter the chamber 40. The chamber 40 may be formed between the patch 30 or patches and the exterior surface of the sidewall 24 of the hose 20. The chamber 40 may be defined as an interior cavity or space of the patch 30 which abuts the sidewall hole 22. When two patches 30 are used, as is shown, the chamber 40 may be formed by removing a segment from an interior volume of a lower patch. Commonly, the chamber 40 may be formed between interior sidewalls 34, a ceiling 36, and the exterior surface of the hose 20 (or an interfacing material which is affixed to an exterior surface of the hose 20). The specific dimension of the chamber 40 may vary, which may be dependent on the size of the patch 30.

The at least one nozzle 50 may commonly include two or more nozzles 50 within each patch 30. The nozzle 50 may be characterized as an opening within the patch 30 that allows the fluid within the chamber 40 to be expelled into a surrounding environment. The nozzle 50 may include the use of a grommet, a spout, or a similar structure to maintain a shape or size of the nozzle 50 within the patch 30, or to assist with directing the flow of fluid through the nozzle 50. The nozzle 50 may be formed in an exterior wall 32 of the patch 30 or patches, such that it is in fluid communication with the chamber 40.

The presence of the chamber 40 within the fluid path through the apparatus 10 (identified by arrows 60 in FIGS. 3-4), may be important in controlling the fluid spray path external of the apparatus 10 (identified by arrows 62 in FIGS. 3-4). While a single hole within the hose 20 may allow fluid therein to exit the hose 20, the flow of the fluid through the single hole alone may be largely unidirectional, bidirectional at best. In other words, the fluid exiting the single hole would have the shape of a narrow stream before falling to the ground outside of the hose 20. The use of the chamber 40 forces the fluid within the hose 20 to experience a turbulent fluid path 60 through the apparatus 10 prior to exiting. This turbulent or disruptive fluid path 60 may create a complex flow of the fluid, which allows the fluid to exit the nozzle 50 with a wide stream prior to falling to the ground. As shown in FIGS. 3-4, the fluid path 60 within the apparatus 10 may include fluid exiting the sidewall hole 22 and being forced to move laterally within the chamber 40. The fluid may repeatedly contact the interior sidewalls 34 of the chamber 40, the ceiling 36 of the chamber 40, and the abutting portion of exterior surface of the hose 20 sidewall 24 before being expelled from the nozzle 50. These complex flow patterns will cause the fluid spray path 62 external of the apparatus 10 to be a multidirectional, three-dimensional, wide area spray pattern, which can significantly aid in protecting the hose 20 from radiant heat of an encroaching fire. Such a spray pattern is useful for creating a fire break that can be used to protect structures and infrastructure from fires.

The turbulent and disruptive fluid path 60 within the apparatus 10 may be controlled by a variety of design specifications of the apparatus 10, including the size of the chamber 40, the positioning of the chamber 40 relative to the sidewall hole 22, the positioning of the nozzle(s) 50 relative to the sidewall hole 22, or others. For example, the nozzle 50 may be axially misaligned with the at least one sidewall hole 22, such that a central axis of the nozzle 50 is misaligned with a central axis of the sidewall hole 22, thereby preventing fluid from flowing in a unidirectional path through both the sidewall hole 22 and nozzle 50. In another example, a cross-sectional footprint of the nozzle 50 may be non-overlapping a cross-sectional footprint of the sidewall hole 22, such that there is no cross-sectional area of either the sidewall hole 22 or nozzle 50 that is positioned overlapping. The sidewalls 34 of the chamber 40 may also be positioned a spaced distance from the nozzle 50, such that a sidewall of the nozzle 50 is not aligned with a sidewall 34 of the chamber 40. This positioning may force the fluid path 60 to move past the nozzle 50, contact the sidewall 34, and move back towards a middle of the chamber 40, and so forth, before being expelled from the nozzle 50.

It is noted that the apparatus 10 may be sized to be a low-profile structure, such that it does not interfere with normal usage of the hose 20, such as when the hose 20 is spooled on a reel or folded into a storage compartment of a fire truck. If the multiplicity of patches 30, chambers 40, and nozzles 50 formed along the length of the hose 20 were not low-profile, but had significant protrusions, the hose 20 may be hindered from smoothly deploying from a reel or a folded geometry. The significant protrusions could create snags and tangles in the hose 20 which could prevent proper hose 20 deployment. Additionally, the hose 20 and the patch 30 may be constructed from flexible materials which allow reeling or folding of the apparatus 10 easily. In one example, the patch 30 material may be constructed from the same material as the flexible hose 20. The overall height of the apparatus 10 from the exterior surface of the hose 20 may vary, depending on the design.

Figure 5:
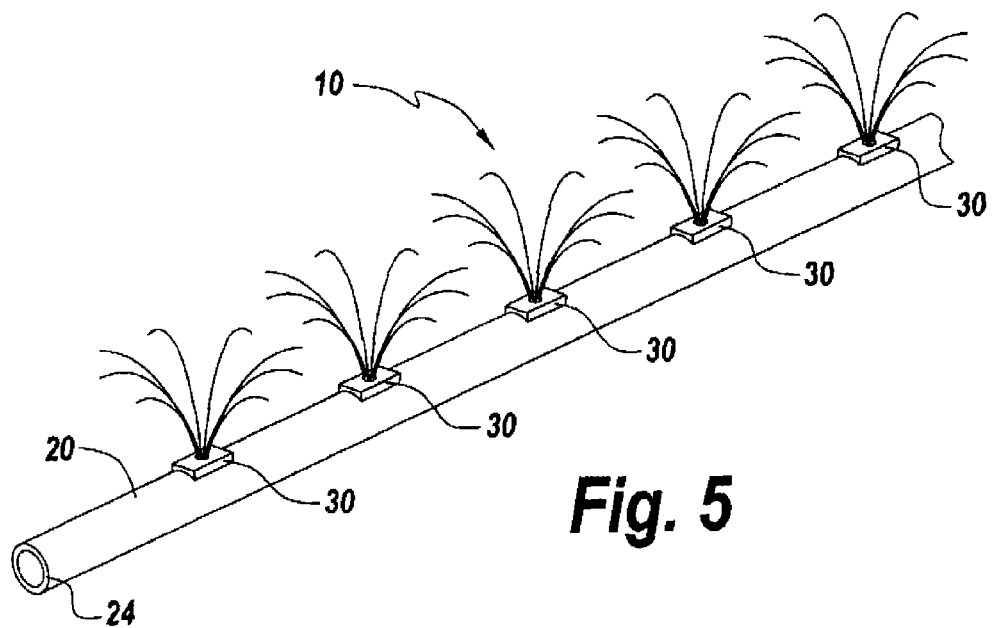
FIG. 5 is an isometric view illustration of the fluid hose apparatus with integrated nozzle, in accordance with the first exemplary embodiment of the present disclosure.

FIG. 5 is an isometric view illustration of the fluid hose apparatus with integrated nozzle 10, in accordance with the first exemplary embodiment of the present disclosure. The structure of the apparatus 10 as described in FIGS. 1-4 may be applied along a length of hose 20 at spaced intervals. The apparatus 10 includes a plurality of sidewall holes formed within the sidewall 24 of the hose 20 and positioned at spaced intervals along the length of the hose 20. A plurality of patches 30 are affixed to the sidewall 24 of the hose 20 at spaced intervals, corresponding to the spaced intervals of the sidewall holes, such that each of the plurality of patches 30 is positioned over at least one of the plurality of sidewall holes. Each patch 30 has the chamber formed therein and each of the plurality of patches 30 has the at least one nozzle formed in the exterior wall thereof. The patches 30 are placed at spatial intervals to produce a spray that supplies a desired flow pattern along the length of the hose 20.

Figure 6:
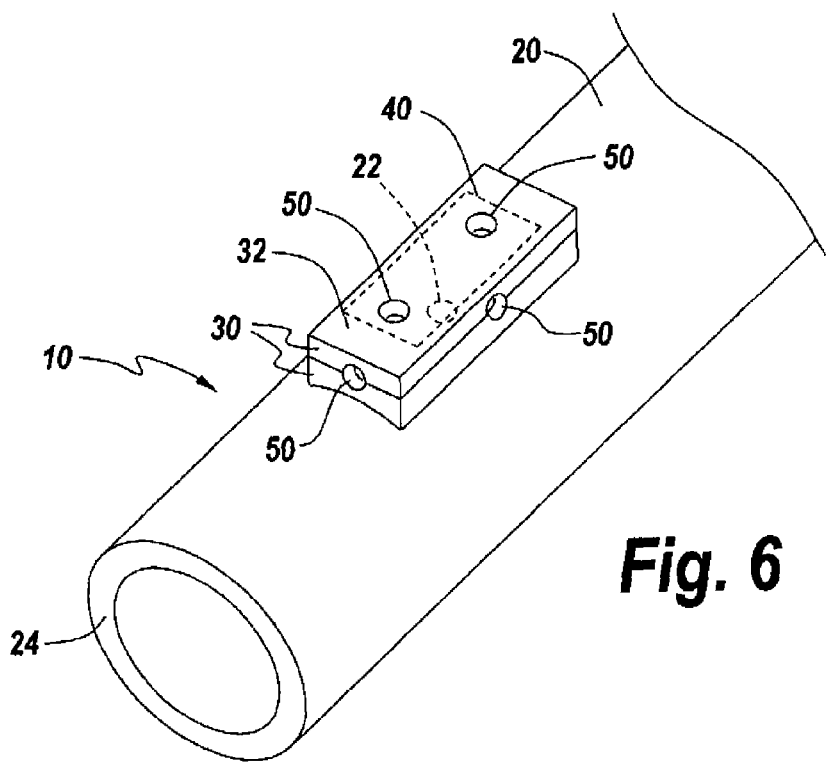
FIG. 6 is an isometric view illustration of a fluid hose apparatus with integrated nozzle, in accordance with the first exemplary embodiment of the present disclosure.

FIG. 6 is an isometric view illustration of a fluid hose apparatus with integrated nozzle 10, in accordance with the first exemplary embodiment of the present disclosure. The apparatus of FIG. 6 includes nozzles 50 that are positioned on both an upper exterior wall 32 or ceiling of the patch 30 and a sidewall of the patch 30 on both a side and front of the patch 30. The use of nozzles 50 on various sides of the patch 30 may allow for an increased fluid spray path surrounding the hose 20. Each of the nozzles 50 may be in fluid communication with the chamber 40 which is in fluid communication with the sidewall hole 22 positioned in the sidewall 24 of the hose 20. It is noted that the nozzles 50 may be positioned on the patch 30 in a variety of locations, including any of the sidewalls or any location within the exterior wall 32.

Figure 7:
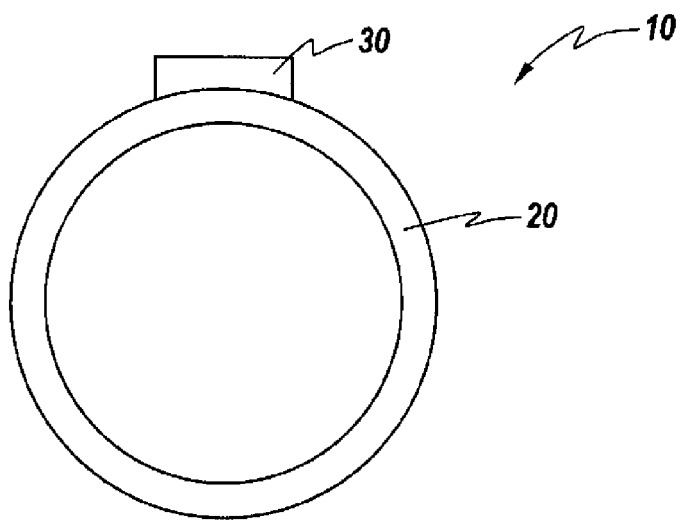
FIG. 7 is a side view illustration of the fluid hose apparatus with integrated nozzle of FIG. 1 having a round hose, in accordance with the first exemplary embodiment of the present disclosure.
Figure 8:
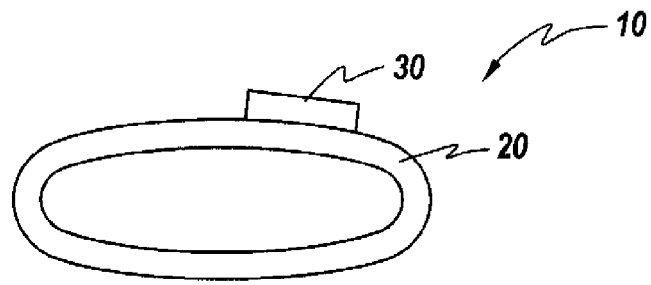
FIG. 8 is a side view illustration of the fluid hose apparatus with integrated nozzle of FIG. 1 having a lay-flat hose without pressurized fluid, in accordance with the first exemplary embodiment of the present disclosure.
Figure 9:
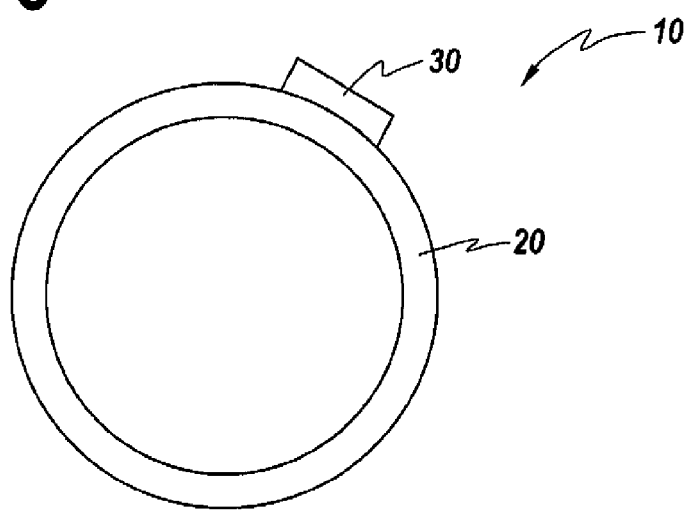
FIG. 9 is a side view illustration of the fluid hose apparatus with integrated nozzle having a lay-flat hose of FIG. 8 with pressurized fluid, in accordance with the first exemplary embodiment of the present disclosure.

FIG. 7 is a side view illustration of the fluid hose apparatus with integrated nozzle 10 of FIG. 1 having a round hose 20, in accordance with the first exemplary embodiment of the present disclosure. FIG. 8 is a side view illustration of the fluid hose apparatus with integrated nozzle 10 of FIG. 1 having a lay-flat hose 20 without pressurized fluid, in accordance with the first exemplary embodiment of the present disclosure. FIG. 9 is a side view illustration of the fluid hose apparatus with integrated nozzle 10 having a lay-flat hose 20 of FIG. 8 with pressurized fluid, in accordance with the first exemplary embodiment of the present disclosure. With reference to FIGS. 7-9, the hose 20 may include many types of hoses having a variety of shapes. For example, FIG. 7 illustrates the hose 20 as a round hose which always maintains a round cross-sectional shape. FIG. 8 illustrates a hose 20 with a lay-flat design, where the hose 20 assumes a thin oval shape when there is no pressurized fluid inside it. The lay-flat design allows a greater length of hose 20 to be stored in a given volume than would be the case for a hose 20 that always has a round shape. When a sufficient pressure is applied to fluid in the lay-flat design of the hose 20, the hose 20 assumes a round shape, as is shown in FIG. 9. Each of the hoses 20 in FIGS. 7-9 is illustrated with the patch 30 with nozzle positioned on the hose 20. The angular orientation of the patch 30 with nozzle in FIGS. 7 and 9 may be controlled when the hose 20 is deployed onto the ground, as discussed further herein.

Figure 10A:
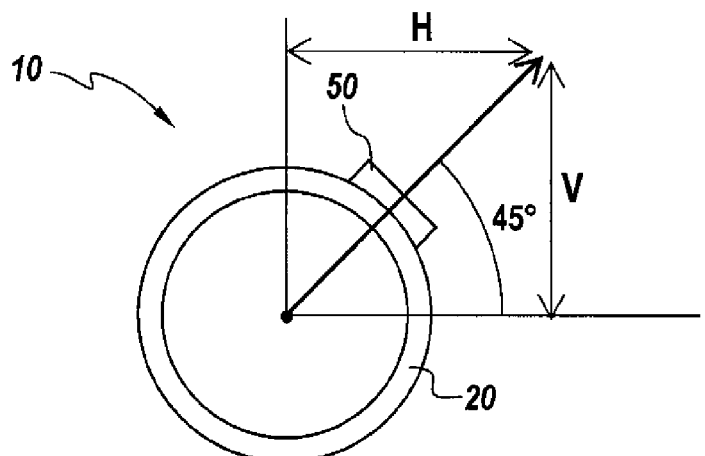
FIGS. 10A-10C are schematic illustrations of the fluid hose apparatus with integrated nozzle of FIG. 1 showing various nozzle positions, in accordance with the first exemplary embodiment of the present disclosure.
Figure 10B:
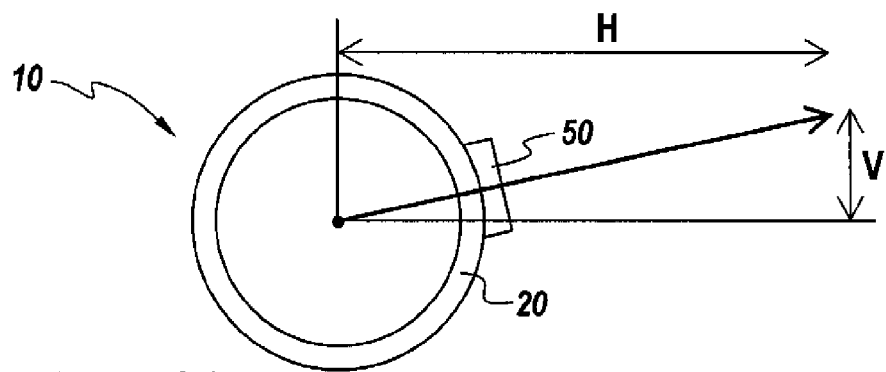
Figure 10C:
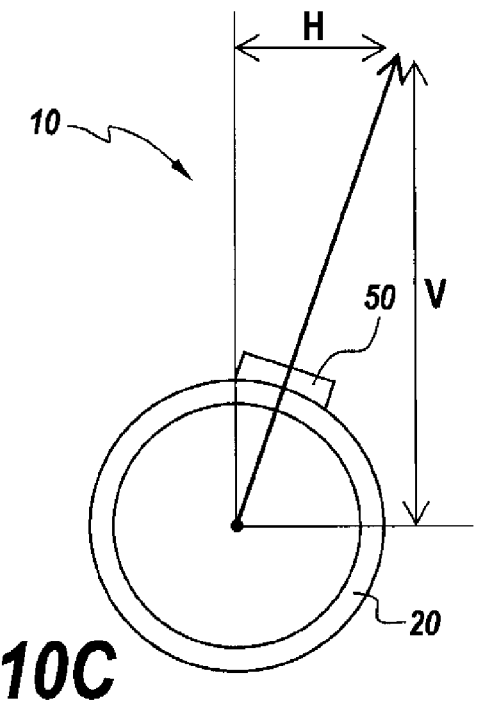

FIGS. 10A-10C are schematic illustrations of the fluid hose apparatus with integrated nozzle 10 of FIG. 1 showing various nozzle 50 positions, in accordance with the first exemplary embodiment of the present disclosure. The angle that the water sprays from the nozzles 50 on the hose 20 can be varied, as expressed in the horizontal distance H and the vertical distance V in FIGS. 10A-10C. For example, if the angle is 45 degrees from the vertical, as shown in FIG. 10A, then the vertical and horizontal distances of the spray will tend to be the same. A flatter angle with a larger horizontal distance may give more protection to the hose 20 from the fire. FIG. 10B shows the angle to the ground to be much less than 45 degrees. This angle makes H much larger than V. A more vertical angle, as shown in FIG. 10C, with a larger vertical height, may also be able to stop the spread of taller fires. The angle can be changed by rotating the hose 20 relative to a ground surface.

Figure 11:
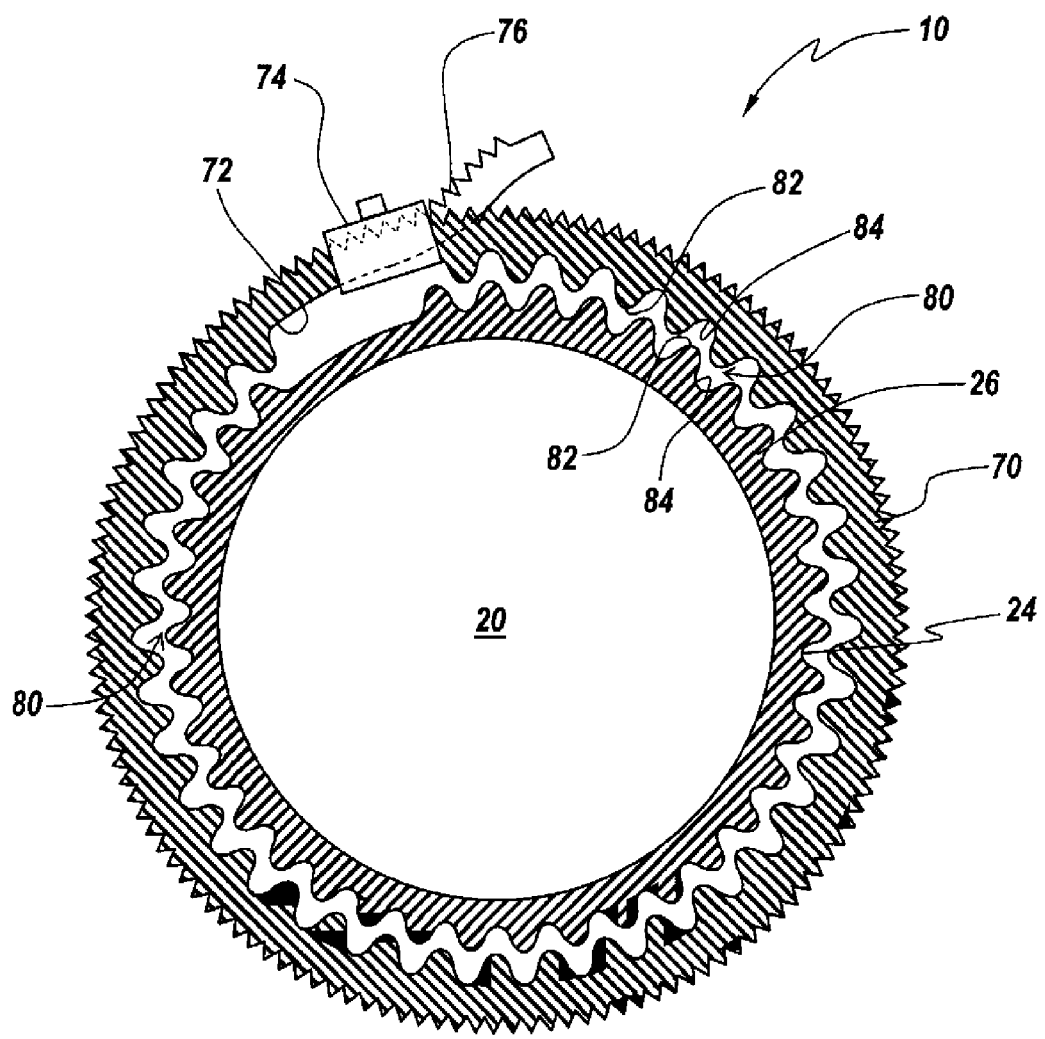
FIG. 11 is a partially exploded side view illustration of the fluid hose apparatus with integrated nozzle of FIG. 1 with a binding strap, in accordance with the first exemplary embodiment of the present disclosure.

FIG. 11 is a partially exploded side view illustration of the fluid hose apparatus with integrated nozzle 10 of FIG. 1 with a binding strap 70, in accordance with the first exemplary embodiment of the present disclosure. The binding strap 70 may be a structure similar to a bundling strap or cable tie, which encircles the hose 20 and connects with the hose 20, such that the hose 20 can be rotated to angle the nozzle in a specific direction, as discussed relative to FIGS. 10A-10C. The binding strap 70 may include a locking device 74 which is permanently attached to one end of the strap length and allows the other end to be received through the locking device 74 and retained therein. As is known in the art, the locking device may utilize a plurality of teeth 76 with a biasable locking pin that engages the teeth 76 inside the locking device 74. The locking pin may be controlled with a button or similar structure positioned on the locking device 74.

The binding strap 70 may be connected to the exterior surface 26 of the hose 20 with a mateable surface engagement 80 positioned between an interior surface 72 of the binding strap 70 and the exterior surface 26 of the hose 20. The mateable surface engagement 80 may include two mateable undulating surfaces, one positioned on the exterior surface 26 of the hose 20 and one positioned on the interior surface 72 of the binding strap 70. Each of the undulating surfaces may include a plurality of peaks 82 and valleys 84, or similar shapes, which allow the two structures to engage when positioned together, such as when the binding strap 70 is tightened around the hose 20. When engaged, the binding strap 70 may be sufficiently connected to the hose 20 to allow the two structures to move in a unitary fashion, such that rotation of the binding strap 70 will cause the hose 20 to rotate. The undulating surface on the hose 20 may be positioned at select locations along the hose 20 or run parallel to an entire length of the hose 20. Similarly, the undulating surface may be positioned at select locations radially about the hose 20 and on select locations on the interior surface 72 of the binding strap 70, all of which are considered within the scope of the present disclosure. It is noted that the binding strap 70 may be used for both round and lay-flat hoses 20.

Figure 12:
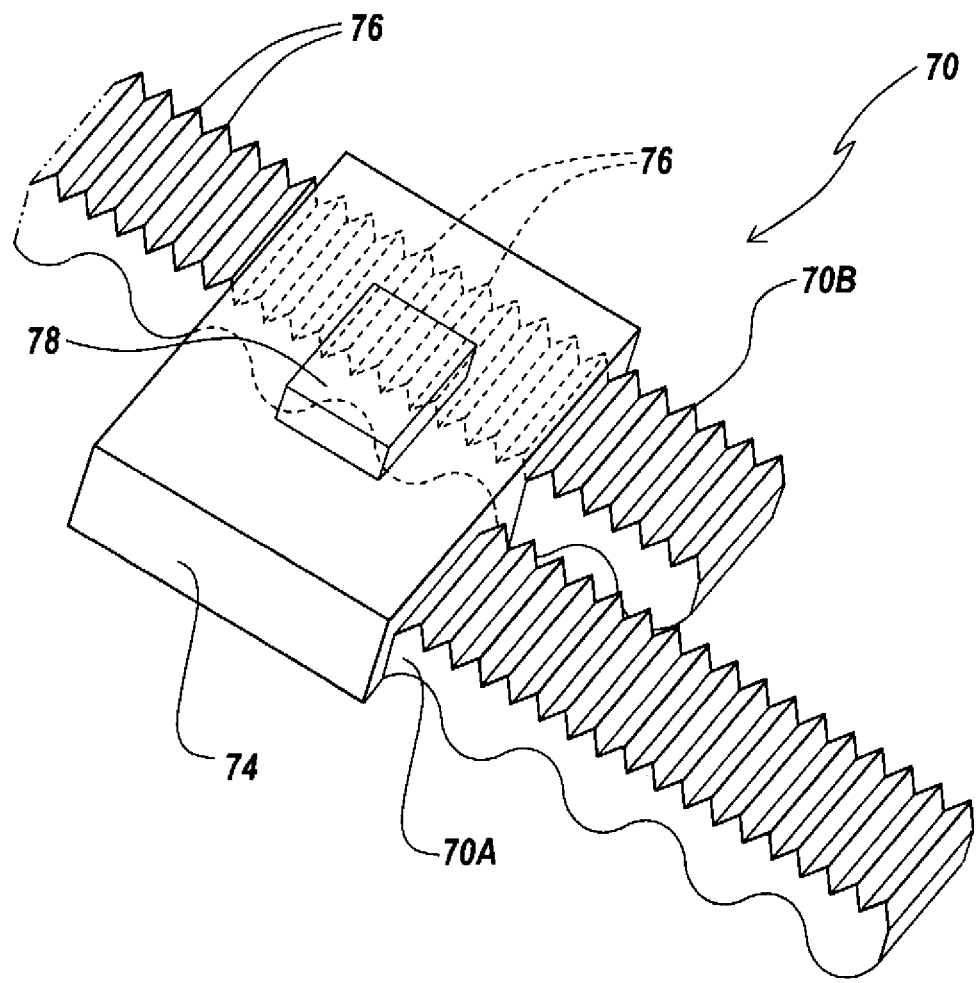
FIG. 12 is an isometric view illustration of the locking device of the binding strap, in accordance with the first exemplary embodiment of the present disclosure.

FIG. 12 is an isometric view illustration of the locking device 74 of the binding strap 70, in accordance with the first exemplary embodiment of the present disclosure. As is shown, the locking device 74 may be permanently attached to one end 70A of the binding strap 70 and allows the free end 70B to be received through the locking device 74 and retained therein. The releasing button 78 may allow the binding strap 70 to be unlocked and loosened or removed from the hose. The ends of the binding strap may be placed side by side in the same plane when they're positioned within the locking device 74 so that the binding strap 70 can make maximum contact with the hose.

Figure 13:
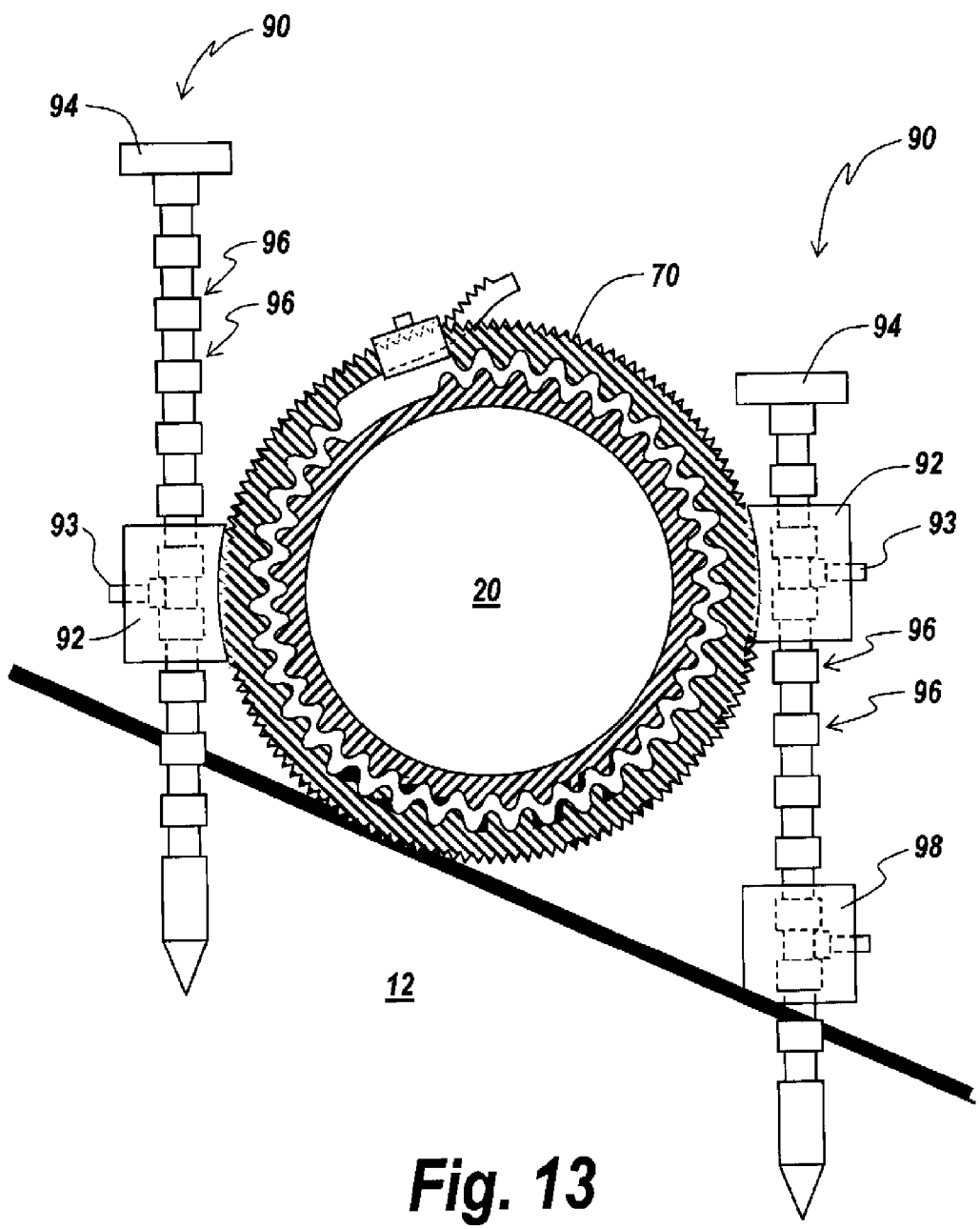
FIG. 13 is a side view illustration of the fluid hose apparatus with integrated nozzle in use with a binding strap and a positioning device, in accordance with the first exemplary embodiment of the present disclosure.

FIG. 13 is a side view illustration of the fluid hose apparatus with integrated nozzle 10 in use with a binding strap 70 and a positioning device 90, in accordance with the first exemplary embodiment of the present disclosure. The positioning device 90 may be connected to the binding strap 70 with a retaining mechanism 92, where adjustment of the retaining mechanism 92 relative to the positioning device 90 controls a radial direction of the at least one nozzle 50. The positioning device 90 may include a spike 94 positionable through a ground surface 12. The spike 94 may have a plurality of notches 96 which the retaining mechanism 92 is adjustable along, such that the retaining mechanism 92 can be moved along a length of the spike 94 on the plurality of notches 96.

The spike 94 may be positioned passing through the retaining mechanism 92, which is fixedly attached to the binding strap 70. The notches 96 within the spike 94 may be formed by removing material from the spike 94 at spaced intervals along the length of the spike 94, such that the retaining mechanism 92 can interface with one or more of the notches 96. These notches 96 may allow for the spike 94 to be securely attached to the retaining mechanism 92 at a variety of positions along the spike 94, such that the retaining mechanism 92 can be positioned at various heights along the spike 94 when the spike 94 is positioned within the ground surface 12. The release button 93 on the retaining mechanism 92 may be pulled or otherwise engaged to disengage the retaining mechanism 92 from the notches 96 to allow the spike 94 to move up or down inside the retaining mechanism 92. When the release button 93 is no longer being pulled, a spring may return the retaining mechanism 92 to an engaged or locked position, where the spike 94 can be held in place by a portion of the release button 93 being inserted into the notches 96. Similar mechanical engagements may also be used.

As is shown in FIG. 13 a plurality of spikes positioning devices 90 having a plurality of spikes 94 and retaining mechanisms 92 may be utilized. Furthermore, while FIG. 13 illustrates the apparatus 10 being retained with the positioning device 90 on an angled surface, such as a hill or a sloped ground, the positioning device 90 can be used on any ground surface, including flat surfaces, to retain the hose 20 in a desired position. The specific desired position may be one where the nozzle 50 formed in the patch 30 is angled to produce a desired spray path of the fluid. The positioning device 90 may further include an anchoring mechanism 98 which is positioned on the spike 94 proximate to the ground surface 12. The anchoring mechanism 98 may control distance of insertion of the spike 94 through the ground surface 12. The anchoring mechanism 98 may be slid over one or more spikes 94 and positioned proximate to the ground surface in order to prevent the weight of the water in the hose from causing the spikes 94 to be pushed deeper into the ground. The anchoring mechanism 98 may operate the same as the retaining mechanisms 92, utilizing release buttons which allow the anchoring mechanism 98 to move up and down along the spikes 94.

It is noted that the apparatus 10 may be used to supply fluid along the length of the hose 20 where the nozzles 50 are positioned. The nozzles 50 may create a wall of spray that is high, wide and deep, sufficient to prevent radiant heat damage to the hose 20 and to any structures which the hose is positioned to protect. Such a hose 20 could be deployed from a vehicle at a location where a wide front grassfire or wildfire is approaching. A water tanker truck and a pump would be used to supply water or foam to the multiple spray nozzles 50 on said long hose 20. The pump could be started by firefighters who can then leave the area for a safer location. The pump could also be started by remote control, which could allow firefighters to leave the area and to remotely start the water flow at the optimum time. The water would spray out of the nozzles 50 at the same time. A fire with a wide front could be stopped by the apparatus 10 as described herein.

The apparatus 10 can be used to protect a home from nearby grassfires and wildfires. Even if a homeowner removes nearby trees and shrubs from a home, blowing embers from the nearby fires can set the home on fire. The apparatus 10 can protect the house from embers by creating a thick wall of water which can extinguish these embers before they reach the home. The apparatus 10 having multiple nozzles 50 could be useful for preventing prescribed fires from getting out of control. Prescribed fires can get out of control if the local winds shift direction or become stronger than expected. A longer hose 20 could be deployed around portions of an area that is going to be burned by a prescribed fire. This hose 20 surrounding a planned prescribed fire would allow for more prescribed fires to be set, since the hose 20 can be used to extinguish a fire when it is going out of control. Accordingly, the apparatus 10 could make weather condition changes less of a problem.

Figure 14:
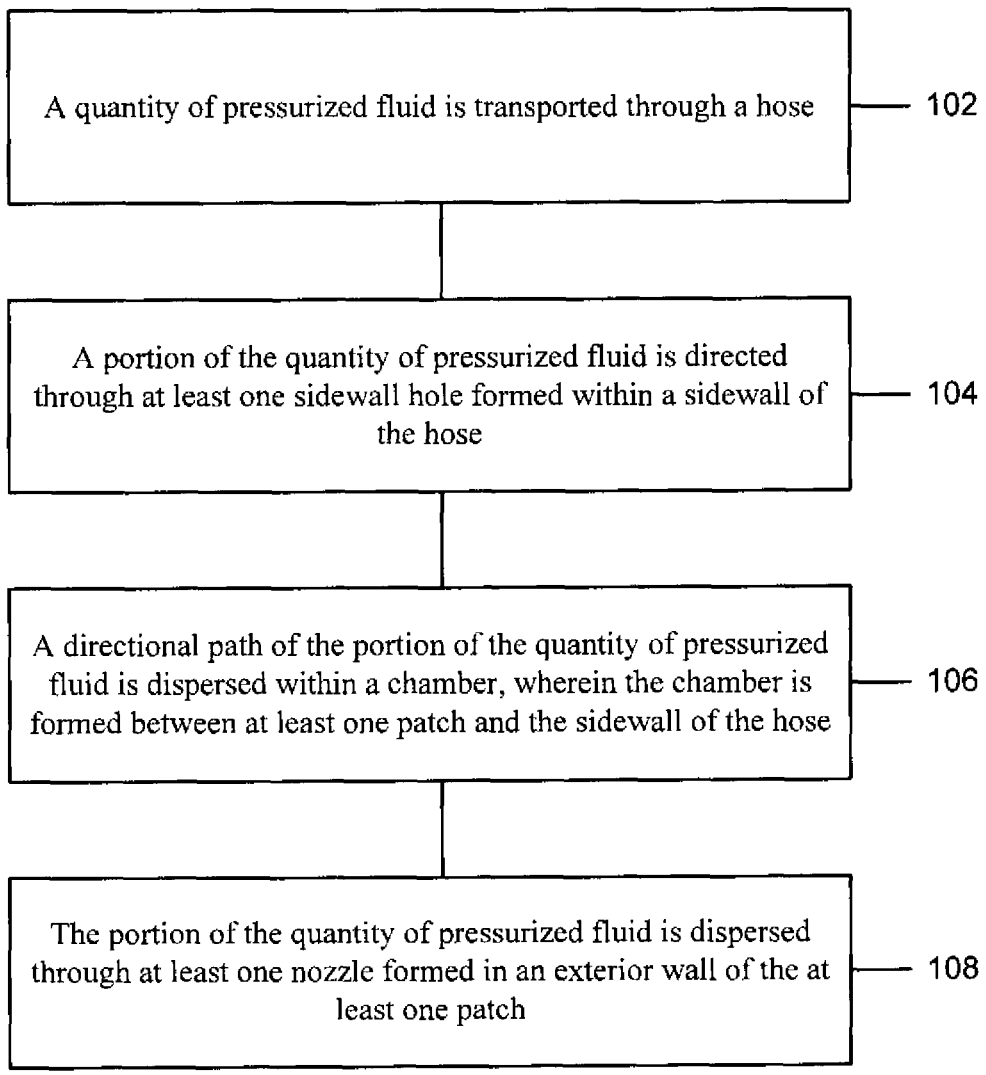
FIG. 14 is a flowchart illustrating a method of protecting an elongated hose from a heat source, in accordance with the first exemplary embodiment of the disclosure.
Figure 1:
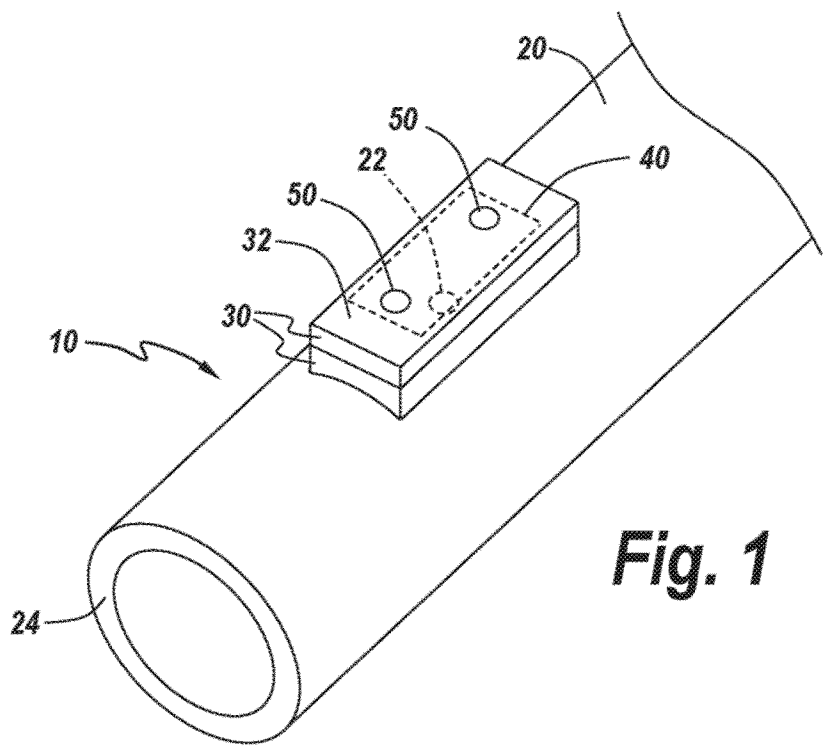
Figure 2:
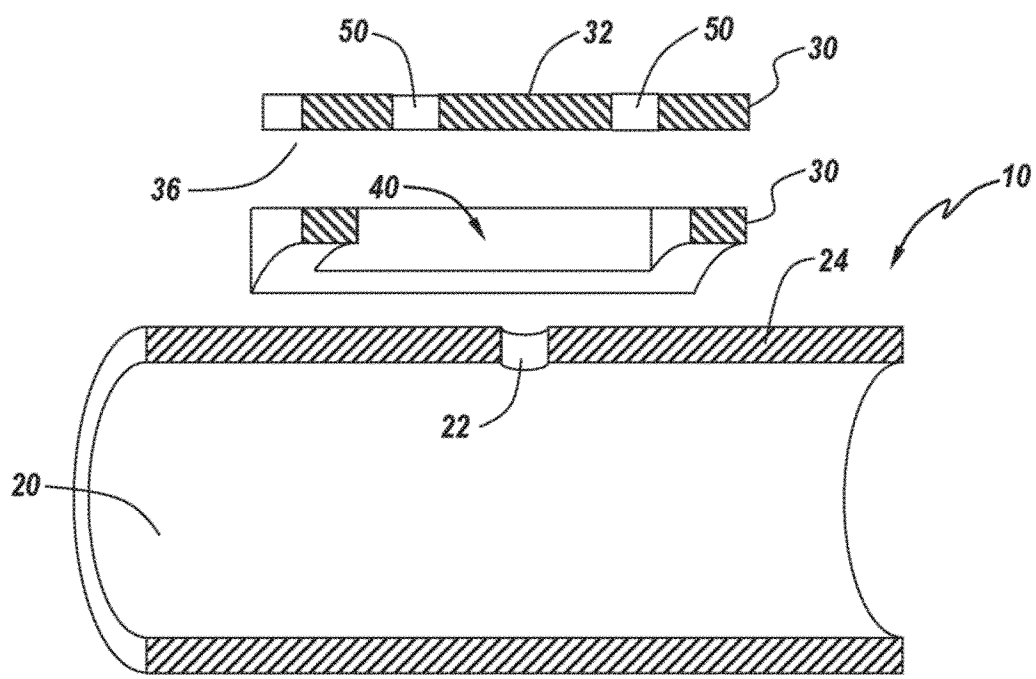
Figure 3:
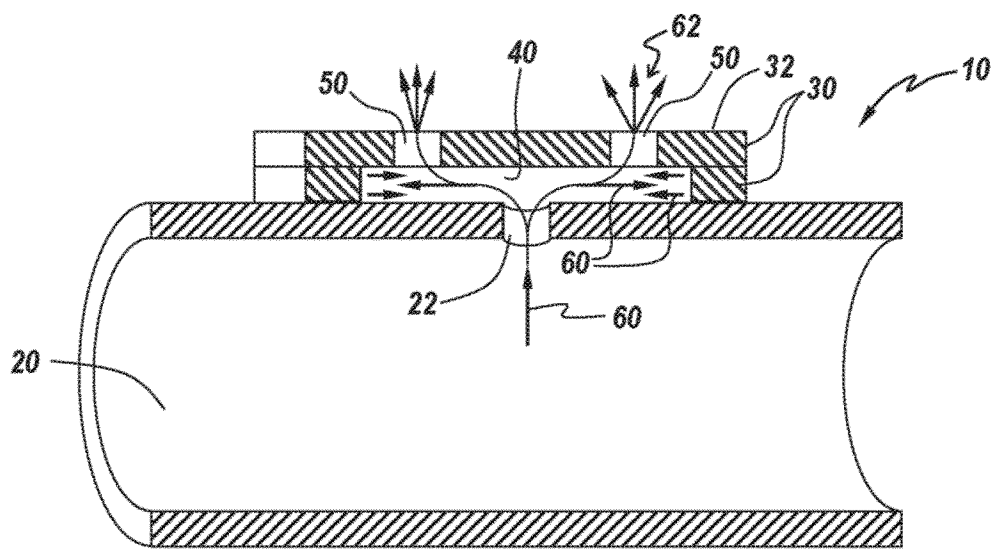
Figure 4:
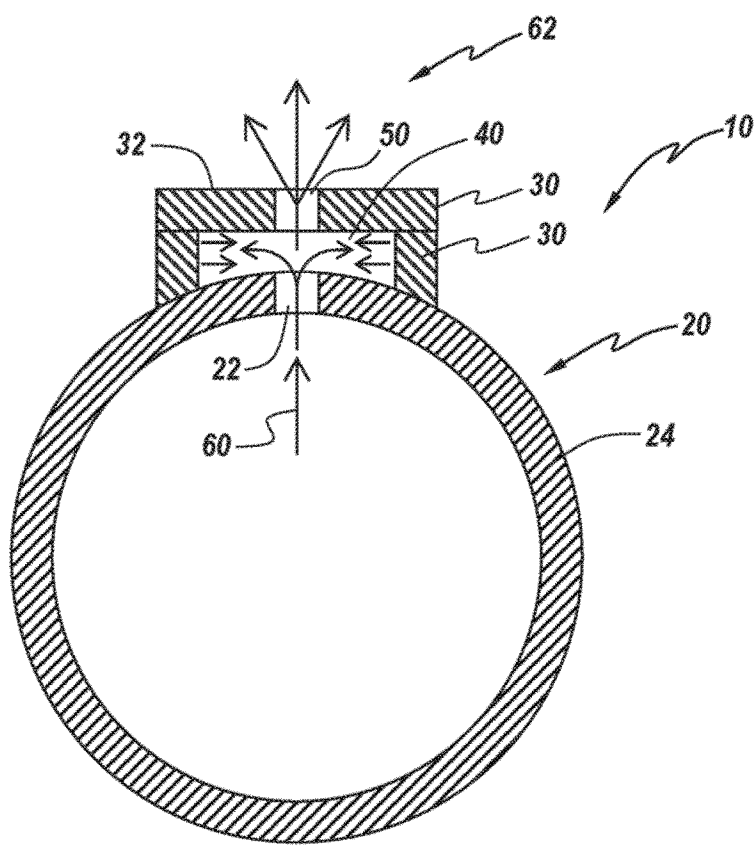

FIG. 14 is a flowchart 100 illustrating a method of protecting an elongated hose from a heat source, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a quantity of pressurized fluid is transported through a hose. A portion of the quantity of pressurized fluid is directed through at least one sidewall hole formed within a sidewall of the hose (block 104). A directional path of the portion of the quantity of pressurized fluid is dispersed within a chamber, wherein the chamber is formed between at least one patch and the sidewall of the hose (block 106). The portion of the quantity of pressurized fluid is dispersed through at least one nozzle formed in an exterior wall of the at least one patch (block 108).

A number of other methods, processes, and functions may be included with the method described herein, including any of the functions described relative to FIGS. 1-13 herein. For example, the dispersed fluid may have a spray direction of substantially 45° degrees to a ground surface on which the hose is positioned. A radial direction of the at least one nozzle may be controlled using a binding strap connected to an exterior surface of the hose, wherein a positioning device is connected to the binding strap with a retaining mechanism, wherein the retaining mechanism is adjusted relative to the positioning device. The binding strap may be connected to the exterior surface of the hose with a mateable surface engagement positioned between an interior surface of the binding strap and the exterior surface of the hose. The positioning device may include a spike positioned through a ground surface, the spike having a plurality of notches, such that controlling the radial direction of the at least one nozzle includes adjusting the retaining mechanism along a length of the spike on the plurality of notches.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A fluid hose apparatus with integrated nozzle comprising:
    a hose having at least one sidewall hole formed within a sidewall thereof, wherein the sidewall has an outer surface;
    at least one patch affixed to the outer surface of the sidewall of the hose, the at least one patch positioned over the at least one sidewall hole, wherein the at least one sidewall hole has an outer perimeter, and wherein the at least one patch has a low profile and is substantially integrated into a general shape of an exterior surface of the hose;
    a chamber formed between the at least one patch and the sidewall of the hose, wherein the chamber is in fluid communication with the at least one sidewall hole, and wherein sidewalls of the chamber are disposed beyond the outer perimeter of the sidewall hole; and
    at least two nozzles formed in an exterior wall of the at least one patch, wherein the at least two nozzles are in fluid communication with the chamber.

2. The apparatus of claim 1, wherein the hose and the at least one patch are constructed from a flexible material.

3. The apparatus of claim 1, wherein the at least one nozzle is axially misaligned with the at least one sidewall hole.

4. The apparatus of claim 1, wherein a cross-sectional footprint of the at least one nozzle is non-overlapping a cross-sectional footprint of the at least one sidewall hole.

5. The apparatus of claim 1, wherein the hose further comprises a lay-flat hose.

6. The apparatus of claim 1, wherein sidewalls of the chamber are positioned a spaced distance from the at least one nozzle.

7. The apparatus of claim 6, wherein a first of the at least two nozzles is positioned through a ceiling of the chamber and wherein a second of the at least two nozzles is positioned through one of the sidewalls of the chamber.

8. The apparatus of claim 1, wherein the hose further comprises a plurality of sidewall holes formed within the sidewall thereof and positioned at spaced intervals along a length of the hose, wherein the at least one patch affixed to the sidewall of the hose further comprises a plurality of patches affixed to the sidewall of the hose at spaced intervals, wherein each of the plurality of patches is positioned over at least one of the plurality of sidewall holes, wherein the chamber is formed between each of the plurality of patches and the sidewall of the hose, and wherein each of the plurality of patches has the at least one nozzle formed in the exterior wall thereof.

9. The apparatus of claim 1, further comprising:
a binding strap connected to an exterior surface of the hose; and
a positioning device connected to the binding strap with a retaining mechanism, wherein adjustment of the retaining mechanism relative to the positioning device controls a radial direction of the at least one nozzle.

10. The apparatus of claim 1, wherein a binding strap is connected to the exterior surface of the hose with a mateable surface engagement positioned between an interior surface of the binding strap and the exterior surface of the hose.

11. The apparatus of claim 10, wherein the mateable surface engagement further comprises two mateable undulating surfaces.

12. The apparatus of claim 9, wherein the positioning device further comprises a spike positionable through a ground surface, the spike having a plurality of notches, wherein the retaining mechanism is adjustable along a length of the spike on the plurality of notches.

13. The apparatus of claim 12, further comprising at least one anchoring mechanism positioned on the spike proximate to the ground surface, wherein the at least one anchoring mechanism controls distance of insertion of the spike through the ground surface.

14. The apparatus of claim 12, further comprising a first positioning device located on a first side of the hose and a second positioning device located on a second side of the hose, the first positioning device adjustable along the length of a first spike and the second positioning device adjustable along the length of a second spike, wherein a position of the retaining mechanism of the first positioning device along the length of the first spike is different from a position of the retaining mechanism of the second positioning device along the length of the second spike.

15. A supply line system for conveying and spraying a fluid, the system comprising:
an elongated hose having a plurality of sidewall holes formed within a sidewall thereof, wherein the sidewall has an outer surface, and positioned at spaced intervals along a length of the hose, the elongated hose carrying a quantity of pressurized fluid;
a plurality of patches, each affixed to the outer surface of the sidewall of the hose and positioned over at least one of the plurality of sidewall holes, wherein each of the plurality of sidewall holes has an outer perimeter, and wherein each patch of the plurality of patches has a low profile and each patch of the plurality of patches is substantially integrated into the general shape of an exterior surface of the hose;
a chamber formed between each of the plurality of patches and the sidewall of the hose, wherein each chamber is in fluid communication with at least one of the plurality of sidewall holes, and wherein sidewalls of each of the chambers are spaced from the outer perimeters of each of the sidewall holes; and
at least two nozzles formed in an exterior wall of each of the plurality of patches, wherein the at least two nozzles are in fluid communication with the chamber of each of the plurality of patches, wherein a portion of the quantity of pressurized fluid is expelled from each of the at least two nozzles.

16. A method of protecting an elongated hose from a heat source, the method comprising:
transporting a quantity of pressurized fluid through a hose;
directing a portion of the quantity of pressurized fluid through at least one sidewall hole formed within a sidewall of the hose wherein the at least one sidewall hole has an outer perimeter, and wherein the sidewall has an outer surface, and;
dispersing a directional path of the portion of the quantity of pressurized fluid within a chamber, wherein the chamber is formed between at least one patch and the sidewall of the hose, wherein sidewalls of the chamber are disposed offset from the outer perimeter of the sidewall hole and wherein the at least one patch is affixed to the outer surface of the sidewall, and has a low profile and is substantially integrated into the general shape of an exterior surface of the hose; and
dispersing the portion of the quantity of pressurized fluid through at least two nozzles formed in an exterior wall of the at least one patch.

17. The method of claim 16, wherein the quantity of pressurized fluid dispersed through the at least one nozzle further comprises a spray direction of substantially 45° degrees to a ground surface on which the hose is positioned.

18. The method of claim 16, further comprising controlling a radial direction of the at least one nozzle using a binding strap connected to an exterior surface of the hose, wherein a positioning device is connected to the binding strap with a retaining mechanism, wherein the retaining mechanism is adjusted relative to the positioning device.

19. The method of claim 18, further comprising connecting the binding strap to the exterior surface of the hose with a mateable surface engagement positioned between an interior surface of the binding strap and the exterior surface of the hose.

20. The method of claim 18, wherein the positioning device further comprises a spike positioned through a ground surface, the spike having a plurality of notches, wherein controlling the radial direction of the at least one nozzle further comprises adjusting the retaining mechanism along a length of the spike on the plurality of notches.

* * * * *

UNITED STATES PATENT AND TRADEMARK OFFICE
CERTIFICATE OF CORRECTION

PATENT NO. : 9,561,393 B2
APPLICATION NO. : 14/713033
DATED : February 7, 2017
INVENTOR(S) : Stephen D. Shoap Page 1 of 3

It is certified that error appears in the above-identified patent and that said Letters Patent is hereby corrected as shown below:

In the Drawings

Delete Drawing Sheets 1 of 9 and 2 of 9. Replace with attached Drawing Sheets 1 of 9 and 2 of 9.

Signed and Sealed this
Thirtieth Day of April, 2019

Andrei Iancu
*Director of the United States Patent and Trademark Office*